United States Patent [19]

Wilkinson

[11] Patent Number: 5,788,299
[45] Date of Patent: Aug. 4, 1998

[54] CONVERTIBLE HAND TOOL

[76] Inventor: James J. Wilkinson, 37050 Metz Rd., Soledad, Calif. 93960

[21] Appl. No.: 851,577

[22] Filed: May 5, 1997

[51] Int. Cl.⁶ .................................................. A01B 1/20
[52] U.S. Cl. .......................... 294/51; 294/55.5; 7/115
[58] Field of Search .............................. 294/49, 51, 52, 294/50.5, 50.9, 55.5, 58, 59, 61; 7/114–116; 172/373–375; 56/400.04, 400.07, 400.11

[56] References Cited

U.S. PATENT DOCUMENTS

| | | | |
|---|---|---|---|
| 374,304 | 12/1887 | Humphrey | 294/50.5 |
| 611,312 | 9/1898 | Beldin | 294/51 |
| 674,117 | 5/1901 | Lefebvre | 294/51 |
| 969,307 | 9/1910 | Sumerlin | 294/51 |
| 1,504,913 | 8/1924 | Simoncelli | 7/116 |
| 2,193,341 | 3/1940 | Mehringer | 294/51 |
| 4,741,149 | 5/1988 | Vom Braucke et al. | 56/400.04 |
| 4,866,922 | 9/1989 | Clark | 56/400.04 |
| 5,165,144 | 11/1992 | Nisenbaum | 16/111 R |
| 5,205,122 | 4/1993 | Wong | 56/400.04 |
| 5,383,696 | 1/1995 | Speier | 294/49 |
| 5,411,101 | 5/1995 | Bonavitacola | 172/378 |
| 5,527,077 | 6/1996 | Bickar | 56/400.04 |

*Primary Examiner*—Dean Kramer
*Attorney, Agent, or Firm*—David L. Volk; Carl Ronald

[57] ABSTRACT

An elongated shaft has a first end and a second end and has a handle fixably attached at the second end. There is also an arcuate solid shovel portion, fixably attached to the first end of the shaft, which has a substantially flat front edge. There is an arcuate rake portion, including a plurality of tines connected by a common base, slidably attached behind the shovel portion by a bracket. The tool can be alternated between the shovel portion and the rake portion via a lever, pivotably attached to the shaft, and a rod pivotably attached to the lever. The rod extends along the shaft to the common base of the rake portion and is slidably attached to the shovel portion by a sleeve located on the shovel portion, adjacent to the first end of the shaft. The rake portion is fixably attached to the rod in order to alternately withdraw and extend the rake portion when the lever is pivoted.

3 Claims, 3 Drawing Sheets

CONVERTIBLE HAND TOOL

BACKGROUND OF THE INVENTION

1. Field of the Invention

This invention relates to implements for tending ground areas.

2. Description of the Related Art

Conventionally, persons performing lawn, garden or yard work have had to carry several tools around the yard. Invariably, as the person is performing the work with one implement, he ends up across the yard from the other tool. Thus, the person performs extra work and wastes time in finding and retrieving the item.

Attempts have been made in the prior art to solve this problem. U.S. Pat. No. 5,383,696 to Speier discloses a multi-purpose shovel-like tool which has diamond shaped openings throughout. It also has tines protruding from the bottom of the structure in order to act as a rake. This prior disclosure, however, has large diamond shaped holes which make it impossible to shovel anything particulate when the individual particles are smaller than the holes. Further, there is no flat edge along the front of the shovel to facilitate scooping of particulate matter.

What is needed is a shovel/rake combination that combines all the utility of a spade or flat-headed shovel with that of a rake.

SUMMARY OF THE INVENTION

The convertible hand tool of the present invention includes an elongated shaft that has a first end and a second end. A handle is fixably located at the second end. There is also an arcuate solid shovel portion, fixably connected to the first end of the shaft and an arcuate rake portion, including a plurality of tines connected by a common base, slidably attached to the shovel portion. The tool alternates between the shovel portion and the rake portion via a transforming means comprised of a lever, pivotably attached to the shaft, and a rod, pivotably attached to the lever, which extends along the shaft to the common base of the rake portion. The rake portion is fixably attached to the rod in order to alternately withdraw and extend the rake portion when the lever is pivoted.

Because this invention combines both a shovel and a rake in one tool, the user will need to carry fewer tools. In addition to reducing weight, this invention reduces the frustration level associated with losing tools while doing yardwork. Because this invention combines two tools in one, it also reduces lower back strain because there is less bending over to switch tools.

Still further features and advantages will become apparent from the ensuing description and drawings.

DETAILED DESCRIPTION

Figure 1:
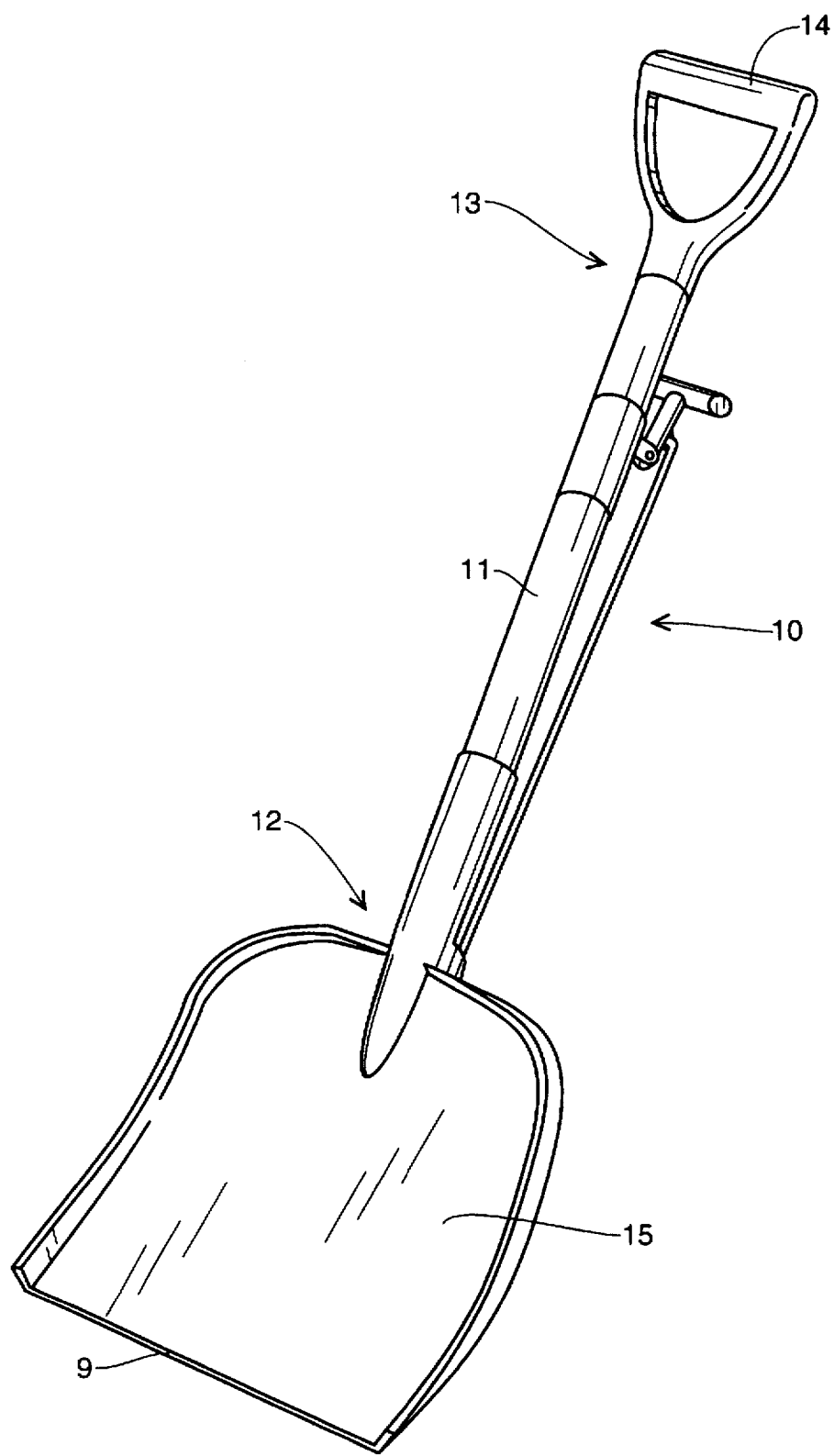
FIG. 1 is a perspective view of the convertible hand tool of the present invention.

FIG. 1 is a perspective view of the convertible hand tool 10 of the present invention. The hand tool 10 includes an elongated shaft 11 that has a first end 12 and a second end 13. A handle 14 is fixably located at the second end 13. There is also an arcuate solid shovel portion 15, fixably connected to the first end 12 of the shaft 11. The shovel portion 15 includes a substantially flat front edge 9.

Figure 2:
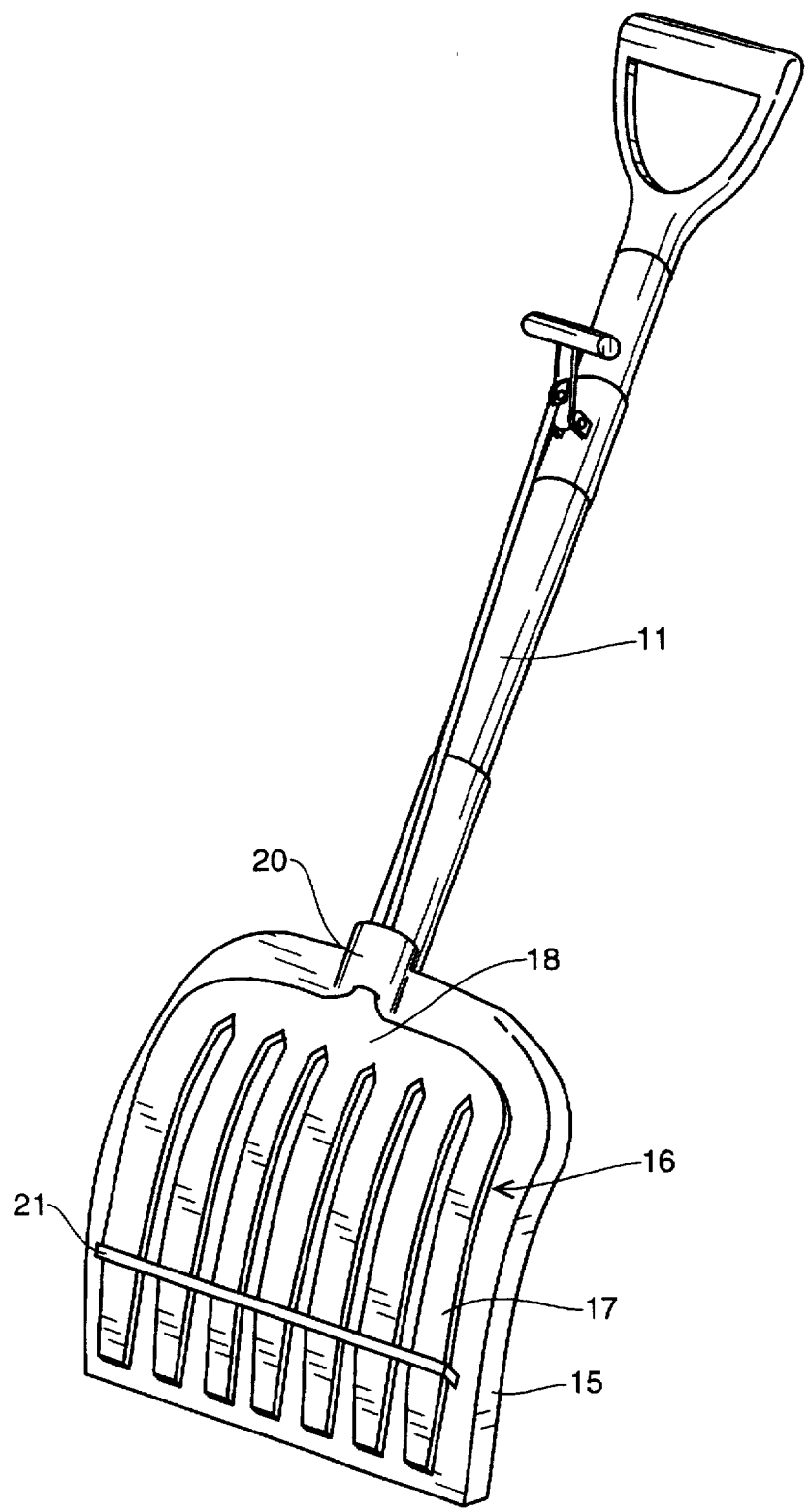
FIG. 2 is a perspective view of the convertible hand tool from a different viewpoint.

FIG. 2 is a perspective view of the hand tool 10 of the present invention from a different viewpoint. An arcuate rake portion 16, including a plurality of tines 17 connected by a common base 18, is mounted adjacent to the shovel portion 15. The rake portion 16 is slidably connected to the shovel portion 15 by a sleeve 20 located where the shovel portion 15 meets the shaft 11. The rake portion 16 is further attached to the shovel portion 15 by a bracket 21 located to slidably secure the rake portion 16 to the shovel portion 15 and to support the tines 17 during use.

Figure 3:
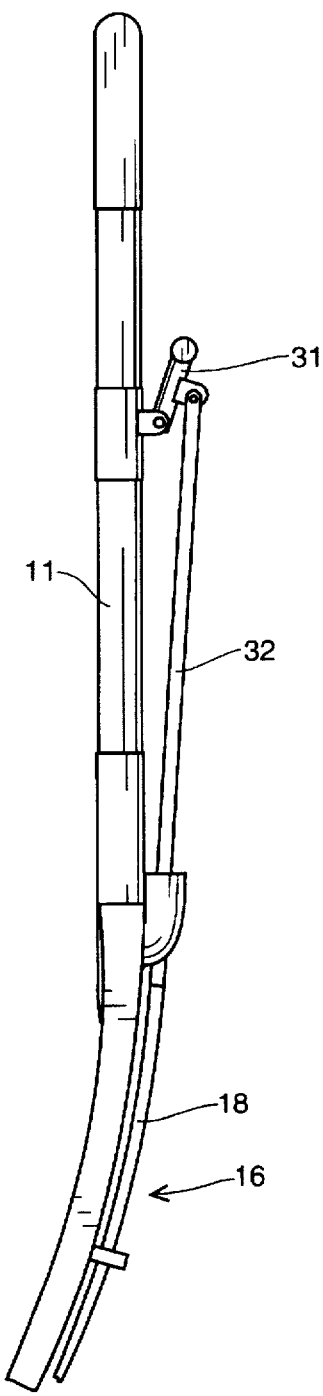
FIG. 3 is an elevational view of the present invention with the rake retracted.
Figure 4:
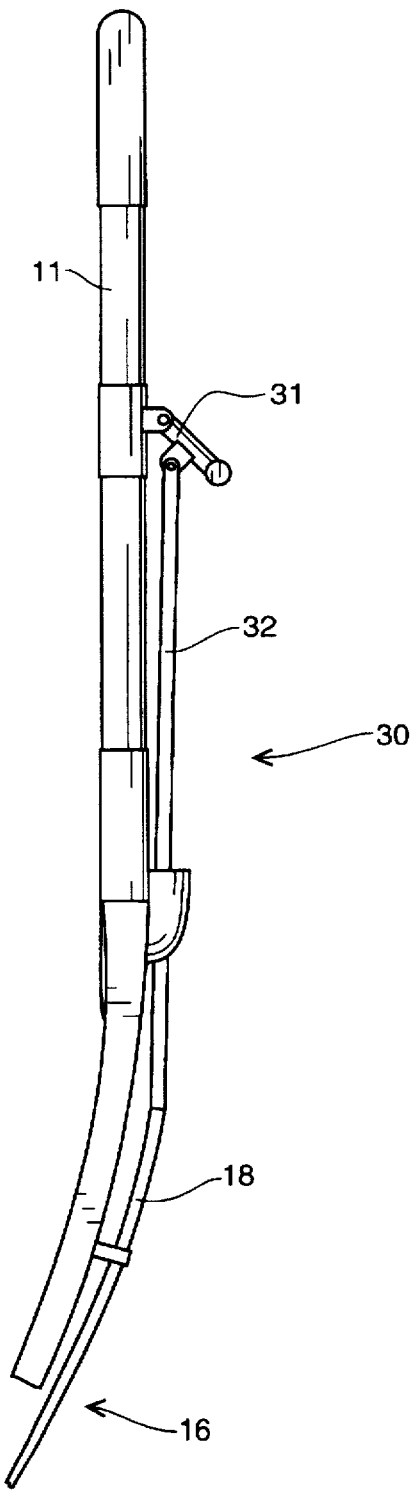
FIG. 4 is an elevational view of the present invention with the rake extended.

FIGS. 3 and 4 demonstrate the operation of the transforming means 30. This transforming means 30 includes a lever 31, pivotably attached to the shaft 11, and a rod 32, pivotably attached to the lever 31. The rod 32 extends along the shaft 11 to the common base 18 of the rake portion 16. This rake portion 16 is fixably attached to the rod 32 in order to alternately withdraw and extend the rake portion 16 when the lever 31 is pivoted.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. For example, and not by way of limitation, the hand tool 10 may comprise different tool heads, such as a fixed shovel portion 15 having a flat front edge 9 as shown, in combination with a slidable spade head instead of rake portion 16. Accordingly, the scope of the invention is to be limited only by the following claims and their legal equivalents.

The invention claimed is:

1. A combination tool comprising:
   a. an elongated shaft having a first end;
   b. a shovel portion connected to the first end of the shaft;
   c. a rake portion slidably connected to the shovel portion;
   d. a lever pivotably attached to the shaft;
   e. a rod pivotably attached to the lever; and
   f. the rod extending along the shaft to the rake portion and fixably attached thereto in order to alternately withdraw and extend the rake portion by pivoting the lever.

2. The combination tool of claim 1, wherein the rake portion includes a plurality of tines connected by a common base located proximate to the shaft, and the rod is fixable attached to the common base.

3. A combination tool comprising:
   a. an elongated shaft having a first end and a second end;
   b. a handle fixably attached to the second end;
   c. an arcuate solid shovel portion, fixably attached to the first end of the shaft;
   d. an arcuate rake portion including a plurality of tines having a common base;
   e. a bracket slidably attaching the rake portion to the shovel portion;
   f. a transforming means comprising:
      (i) a lever pivotably attached to the shaft;
      (ii) a rod pivotably attached to the lever; the rod extending along the shaft to the common base of the rake portion and being fixably attached thereto in order to alternately withdraw and extend the rake portion by pivoting the lever; and
      (iii) a sleeve slidably connecting the rod to the shovel portion directly adjacent to the first end of the shaft.

* * * * *